United States Patent Office 3,780,117
Patented Dec. 18, 1973

3,780,117
HALOMETHYL SUBSTITUTED DERIVATIVES OF DIHALOPHENYLCYCLOPROPANE
Herman A. Bruson, Woodbridge, and Howard L. Plant, Milford, Conn., assignors to Olin Corporation, New Haven, Conn.
No Drawing. Original application Sept. 30, 1968, Ser. No. 763,932, now Patent No. 3,598,857. Divided and this application Jan. 22, 1971, Ser. No. 108,958
Int. Cl. C07c 25/00
U.S. Cl. 260—650 R    3 Claims

ABSTRACT OF THE DISCLOSURE

Halomethyl substituted derivatives of dihalophenylcyclopropanes having the formula:

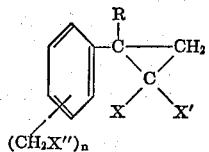

wherein X, X', X'' are each selected from the group consisting of chlorine, bromine, iodine; R is selected from the group consisting of hydrogen or alkyl of from 1 to 5 inclusive carbon atoms and $n$ is an integer of from 1 to 2 inclusive; are prepared by reacting formaldehyde and an acid, such as hydrobromic acid, with a dihalocarbene adduct of styrene.

---

This is a divisional application of Ser. No. 763,932, filed Sept. 30, 1968, now Pat. No. 3,598,857, by Herman A. Bruson and Howard L. Plant.

This invention relates to halomethyl and cyanomethyl substituted derivatives of dihalophenylcyclopropane and to methods for their preparation. More particularly, this invention relates to novel compounds of the formula:

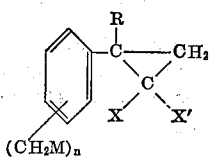

wherein M is selected from the group consisting of chlorine, bromine, iodine, and the radical —CN; X and X' are independently selected from the group consisting of chlorine and bromine, R is selected from the group consisting of hydrogen and alkyl of from 1 to 5 carbon atoms and $n$ is an integer of from 1 to 2 inclusive.

In the first phase of this invention compounds of the formula:

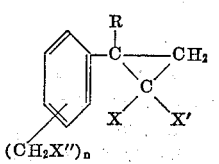

wherein X, X', X'' are each selected from the group consisting of chlorine, bromine, iodine, R is selected from the group consisting of hydrogen or alkyl of from 1 to 5 inclusive carbon atoms and $n$ is an integer of from 1 to 2 inclusive; are prepared by reacting formaldehyde, an acid of the formula: HX'', wherein X'' is chlorine a bromine and iodine and a dichlorcarbene adduct of styrene having the formula:

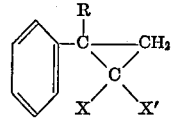

wherein X, X' and R have the same meaning as previously described. The reaction is carried out in the presence of a catalyst which can be, for example, zinc chloride, tin tetrachloride or titanium tetrachloride and, preferably, in the presence of a solvent selected from the group consisting of cyclohexane, heptane, octane, etc.

The reaction proceeds as shown in the following action, where for purposes of illustration, the reaction of 1,1-dichloro-2-phenylcyclopropane, formaldehyde and hydrogen-chloride in the presence of zinc chloride and cyclohexane is shown:

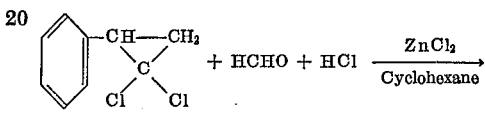

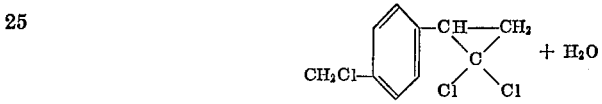

Usually, from about 1 to about 5 moles of the acid are utilized for each mole of the 1,1-dihalo-2-phenylcyclopropane compound. Preferably, however, about 1.5 to 2 moles of the hydrogen halide acid are reacted with each mole of the 1,1-dihalo-2-phenylcyclopropane charged to the reactor. Generally, from about 1.5 to about 4 moles or more of formaldehyde are introduced into the reactor for each mole of 1,1-dihalo-2-phenylcyclopropane utilized and preferably from about 1.5 to about 2.5 moles of formaldehyde are reacted with each mole of the initially added 1,1-dihalo-2-phenylcyclopropane. The reaction temperature employed can be varied over a wide range and usually will be about 50 to about 100° C. or more and preferably will be about 60–90° C. It has been found that the higher temperatures appear to favor the formation of the dihalomethyl substituted product. The time of reaction will vary from about 1 to about 5 hrs. or more depending upon the other reaction conditions selected. The hydrogen halide in gaseous form is added as rapidly as it can be absorbed with virorous stirring and the addition is continued until no more is taken up by the reaction mixture. It is recommended that an excess of the hydrogen halide be avoided since entrainment and loss of formaldehyde can thus be minimized. Paraformaldehyde can be employed as well as formaldehyde.

The product can be recovered from the reaction mixture by a number of methods well known in the art. For example, the reaction mixture after it has been allowed to cool can be treated with an equal volume of water and the organic product extracted from it by a suitable solvent such as diethylether. After the ether extract has been dried, the product can be recovered by evaporating or distilling off the ether.

The 1,1-dihalo-2-phenylcyclopropane starting materials for the method of this invention can also be prepared by the process set forth in U.S. Patent 3,376,349. For example, the compound 1,1-dichloro-2-phenylcyclopropane can be prepared as follows:

A mixture of 104 g. styrene, 120 g. of chloroform, 120 g. sodium hydroxide, 10 g. of water and 100 ml. of tertiary amyl alcohol is rapidly stirred and heated under reflux at 90–97° C. for 35 minutes. At this point the mixture contains about 1.5 moles of water, and the conversion to the dichlorocarbene adduct is about 60 percent of theory based on the styrene charged.

An additional quantity of 60 g. (0.5 mole) of chloroform and 40 g. (1 mole) of sodium hydroxide is added to the cooled product. This reaction mixture is rapidly stirred and then reheated to 101° C. under reflux during a period of about 45 minutes. Upon cooling, pouring into 500 ml. of water, and working up the water-insoluble layer by distillation under reduced pressure, the yield of 1,1-dichloro-2-phenylcyclopropane obtained, (boiling at 77–79° C./2 mm.; $n_D^{25}$ 1.5505) is about 153 g. or 82 percent of theory, based on the styrene charged.

In a like manner, the compound 1,1-dibromo-2-phenylcyclopropane can be prepared as described about by reacting bromoform, styrene, and sodium hydroxide in the presence of water and tertiary amyl alcohol with rapid stirring and heating under reflux. Other 1,1-dihalo-2-phenylcyclopropanes useful as starting materials in the process of this invention which can be prepared in the same manner as described above include 1,1-bromo-2-phenylcyclopropane, 1-chloro-1-bromo-2-phenylcyclopropane, etc.

The first phase of this invention is illustrated by the following specific embodiments which are to be considered not limitative.

EXAMPLE I

Dry hydrogen chloride was passed into a vigorously agitated mixture of 187 g. (1.0 mole) 1,1-dichloro-2-phenylcyclopropane, 60 g. paraformaldehyde, (0.6 mole) zinc chloride, and 50 ml. of cyclohexane as rapidly as absorption occurred at a temperature of 75–85° C. and until no more was taken up. The cooled reaction mixture was treated with an equal volume of ice water and extracted with two 150 ml. portions of diethyl ether. After washing the ether solution with 200 ml. of water, it was dried over sodium sulfate.

The ether was removed by evaporation and the crude product distilled at reduced pressure 142–146° C./1.0 mm.; $n_D^{25}$ 1.5716 to yield 186 g. (78.5 percent theory) of 4'-(2,2-dichlorocyclopropyl) benzyl chloride and 22 g. (7.8 percent theory) of the di(chloromethylated) homologue.

EXAMPLES II–X

A number of additional examples were carried out in the same manner and with the same apparatus as employed in Example I. Pertinent details relating to these examples are set forth in Table 1 which follows:

wherein X and X' are independently selected from the group consisting of chlorine and bromine, R is selected from the group consisting of hydrogen and alkyl of from 1 to 5 inclusive carbon atoms and n is an integer of from 1 to 2 inclusive; are prepared by reacting a compound of the formula: A—CN, wherein A is an alkali metal selected from the group consisting of sodium, potassium and lithium, with a material of the formula:

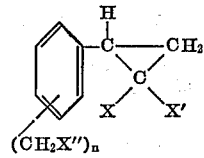

wherein X" is selected from the group consisting of chlorine and bromine and X, X', R and n have the same meaning as previously described.

The above-reaction is conducted in the presence of an inert solvent which can be, for example, ethanol, dimethylformamide or dimethyl sulfoxide.

Generally, the stoichiometric quantity of the alkali metal cyanide is reacted with the halomethyl substituted 1,1-dihalo-2-phenylcyclopropane, however, if desired from about 0.75 to 2 moles of the alkali metal cyanide can be utilized per mole of the initially charged halomethyl substituted 1,1-dihalo-2-phenylcyclopropane compound. The quantity of solvent employed usually will be from about 50 to about 300 cc. or more per mole of the starting halomethyl derivative of the 1,1-dihalo-2-phenylcyclopropane.

Preferably the reaction is conducted at reflux temperature although temperatures ranging from about 40 to about 150° C. or more can be employed.

Recovery of the product can be conveniently accomplished in a variety of ways well known in the art. For example, the reaction mixture can, after being cooled to room temperature and diluted with from 2 to 4 volumes of water, be extracted with a solvent, such as methylene chloride, diethyl ether, benzene, or toluene, to yield an extract containing the product. Recovery of the pure product can then be accomplished by washing with water and drying over sodium sulfate followed by distillation under reduced pressure.

The following example is illustrative of the preparation of cyanomethyl substituted derivatives of dihalophenylcyclopropanes and is to be considered not limitative.

TABLE 1

| Example | Moles A | Moles B | Zinc chloride | Cyclohexane (ml.) | Temp. range (° C.) | Addition time | Yield of C (percent) | Remarks |
|---|---|---|---|---|---|---|---|---|
| II | 1.33 | 0.35 | 0.077 | None | 56–52 | 0.33 | 21.2 | |
| III | 0.4 | 0.4 | 0.09 | 100 | 70–75 | 0.83 | 52 | HCl added as rapidly as it is absorbed. |
| IV | 0.4 | 1.0 | .22 | 100 | 67–70 | 1.50 | 53 | Some D compound found. |
| V | 1.0 | 1.1 | .24 | 50 | 65–70 | 1.25 | 26 | |
| VI | .5 | 1.0 | .26 | 50 | 75 | 1.50 | 64 | |
| VII | 1.0 | 2.0 | 0.6 | 50 | 80–90 | 2.0 | 74 | |
| VIII | 0.5 | 1.5 | .3 | 25 | 80–87 | 0.75 | 76.5 | 5 percent yield of D compound. |
| IX | 0.1 | 0.6 | ¹0.075 | ²24 | 60 | 1.0 | 42 | Many by-products. |
| X | 1.0 | 2.0 | 0.6 | 50 | 75–80 | 2.0 | 78.5 | 8 percent of D compound. |

NOTE.—A=1,1-dichloro-2-phenylcyclopropane; B=Paraformaldehyde; C=4'-(2,2-dichlorocyclopropyl)benzyl chloride; D=Dichloromethyl homologue of C.
¹ Tin tetrachloride.
² Moles of carbon tetrachloride.

Preparation of cyanomethyl substituted derivatives of dihalophenylcyclopropanes

In the second phase of this invention compounds having the formula:

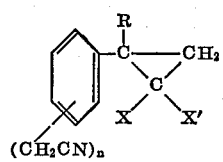

EXAMPLE XI

A concentrated solution of 12.5 g. (0.2 mole) sodium cyanide (in 11 ml. water) was added gradually with stirring to 47.5 g. (0.2 mole) 4'-(2,2-dichlorocyclopropyl) benzyl chloride in 30 ml. of ethanol. The reaction mixture was stirred and heated at reflux for three hours. After cooling, the solution was diluted with 100 ml. of water and extracted with two 75 ml. portions of methylene chloride. The extract was washed with water and dried over sodium sulfate.

Distillation under reduced pressure through a short Vigreaux column yielded 28.3 g. of 4'-(2,2-dichlorocyclopropyl)phenyl acetonitrile boiling at 131–134° C./0.1 mm.; $n_D^{25}$ 1.5591 and having the formula:

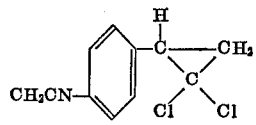

*Analysis.*—Calcd. for $C_{11}H_9Cl_2N$ (MW 226) (percent): C, 58.4; H, 3.98; Cl, 31.4; N, 6.2. Found (percent): C, 58.5; H, 4.29; Cl, 31.1; N, 6.9.

Other nitriles of this type have been prepared in good yield employing dimethyl sulfoxide solvent; for example, the compound:

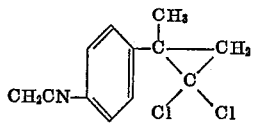

The novel compounds, which contain a high percentage of halogen, are useful as fire retardants for plastics. For example, the compound:

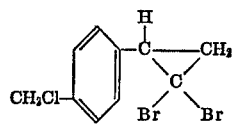

(A)

can be milled into polyethylene on a roll mill or by other suitable means to form a composition containing from about 0.1 to about 2.0 percent by weight of Compound A. The resulting composition exhibits a high degree of burning resistance when compared to the untreated polyethylene. Likewise, compound A can be applied in liquid form as a coating and the thus treated polyethylene dried to give a surface to the plastic having improved burning resistance.

The compounds of this invention are useful agricultural chemicals. In particular, they are useful as soil fungicides and herbicides. For example, the compound:

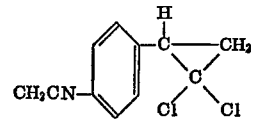

(B)

is highly effective in controlling *Rhizoctonia solani* infested soil when formulated as a 10 percent dust with finely-divided attaclay, vermiculite, talc, etc., and tested at a concentration of about 100 p.p.m. The same Compound B is an extremely valuable aquatic herbicide and when tested against four species of algae and one species of duckweed was found to effectively control these plants.

What is claimed is:
1. A compound of the formula:

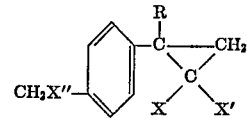

wherein X, X' and X" are each independently selected from the group consisting of chlorine and bromine and R is selected from the group consisting of hydrogen and alkyl of from 1 to 5 inclusive carbon atoms.

2. The compound of claim 1 wherein X is chlorine.
3. The compound of claim 1 having the formula:

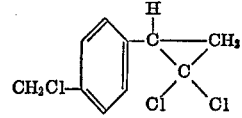

References Cited
UNITED STATES PATENTS

| | | | |
|---|---|---|---|
| 3,021,375 | 2/1962 | Waid et al. | 260—651 HA |
| 2,951,100 | 8/1960 | Adams et al. | 260—651 HA |
| 2,219,873 | 10/1940 | Pinkernelle | 260—651 HA |
| 3,069,480 | 12/1962 | Hirth et al. | 260—651 HA |
| 3,012,079 | 12/1961 | Bruson et al. | 260—650 R |
| 3,046,314 | 7/1962 | Fields et al. | 260—650 R |
| 3,264,359 | 8/1966 | Dickerson et al. | 260—650 R |
| 3,456,023 | 7/1969 | Jureland | 260—650 R |
| 3,376,349 | 4/1968 | Bruson et al. | 260—650 R |

OTHER REFERENCES

Fuson et al.: Organic Reactions, John Wiley and Sons, New York, vol. 1 (1942), pp. 67, 68, 72.

HOWARD T. MARS, Primary Examiner

U.S. Cl. X.R.

260—651.11 A